Feb. 2, 1954    T. HOFFACKER, JR    2,667,887
AUTOMATIC VALVE MEANS
Original Filed April 3, 1947

INVENTOR.
Theodore Hoffacker, Jr.
BY
ATTORNEY

Patented Feb. 2, 1954

2,667,887

UNITED STATES PATENT OFFICE 2,667,887

AUTOMATIC VALVE MEANS

Theodore Hoffacker, Jr., Hagerstown, Md., assignor to Fairchild Engine and Airplane Corporation, a corporation of Maryland Original application April 3, 1947, Serial No. 739,067, now Patent No. 2,491,812, dated December 20, 1949. Divided and this application November 10, 1949, Serial No. 126,519

9 Claims. (Cl. 137—87)

The present invention relates generally to valves and more particularly to improved valve means for automatically interconnecting and equalizing portions of fluid systems.

In hydraulic or other systems, it is frequently desirable that two or more controlled devices be operated to similar or equal extents from two or more separate control points, utilizing either a single or multiple source of fluid pressure. Such controlled devices may be fluid receivers or other pressure-actuated devices to which it may be desirable to apply equal pressures. The present invention is directed to an improved switching or interconnecting and equalizing means by which a second controlled device is automatically subjected to the same pressures, either from identical or duplicate pressure sources, as is a first controlled device. In other words, the present improved valve may be used to automatically interconnect two separate and distinct fluid control systems in such a manner that both controlled devices may be identically controlled by the operation of either control valve at either operator's station.

These conditions are frequently met with in the dual control systems of aircraft and other vehicles, but the improved valve means has general application and is not limited to such specific installations. The improved valve means of the present invention is particularly adapted to the dual controlled brake systems of aircraft and has been disclosed and described in connection with such an aircraft wheel brake system in my co-pending application Serial No. 739,067, filed April 3, 1947, and now Patent No. 2,491,812, granted December 20, 1949, covering Aircraft Wheel Brakes of which the present application is a division.

It is, accordingly, a primary object of the present invention to provide an improved valve means for use in dual hydraulic systems. A further object resides in the provision of improved means for automatically switching or interconnecting a plurality of pressure actuated controlled devices by an improved valve means. A further and corollary objective resides in automatically equalizing the fluid pressures to which such controlled devices are subjected by the interconnection of the devices by the improved valve means.

A further object resides in the provision of an improved valve means for fluid systems incorporating a plurality of separate stations for the control of a plurality of devices to be identically controlled. It is a further and more specific objective of the present invention to provide an improved valve means for a hydraulic brake system incorporating a plurality of independent brake units operatively associated with each wheel of a vehicle. It is a further object to provide an improved valve for such a brake system for an aircraft having at least two landing wheels each of which incorporates two or more braking units, which improved valve means provide for the selective actuation of said brake units from separate operating stations, such as by the pilot and co-pilot of the airplane. It is another object to provide an improved valve for a brake system for a multiple wheeled vehicle by means of which multiple brakes on each wheel are so automatically interconnected and controlled as to be operable from either or both of two operating stations. Further objects reside in the provision of improved valve means for the refinement of operation of brake systems by the use of the improved hydraulic interconnector and equalizer means to provide a smoother and more gradual application of such brake systems by virtue of a slight differential action resulting from the operation of the improved valve means. Still further objects and advantages of the present invention, as more specifically applied to the wheel brakes of aircraft, are set forth in detail in the above-referred-to Patent No. 2,491,812.

Other objects and advantages of the present invention will be apparent to those skilled in the art from the following detailed description of a preferred embodiment of the invention, and the details of its parts, made in connection with the accompanying drawings, in which.

Figures 1, 2, 3:
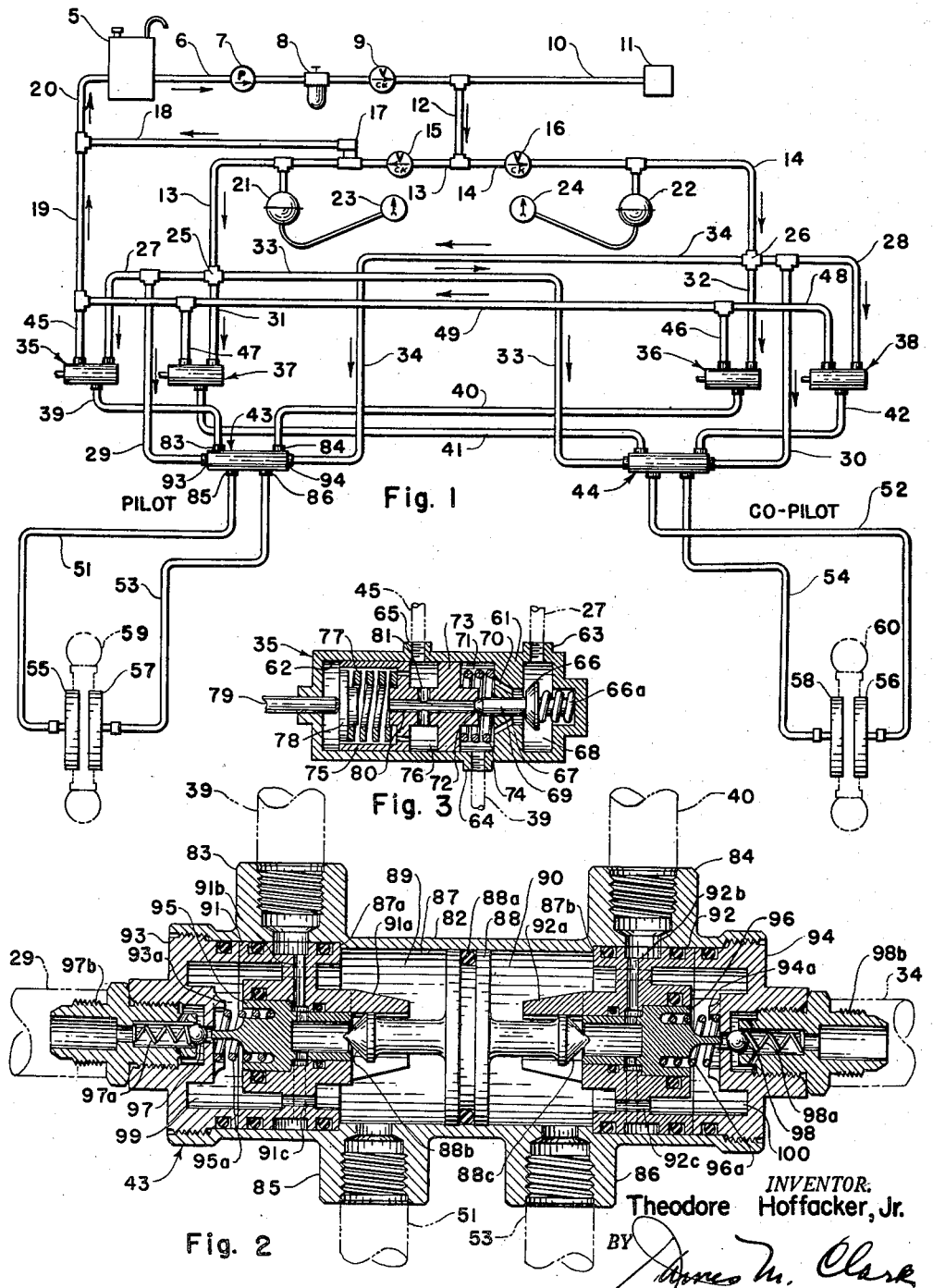
Figure 1 is a diagrammatic illustration of a preferred form of the brake system.
Figure 2 is a detailed cross-sectional view of the improved interconnector and equalizer means.
Figure 3 is a schematic view of the operating elements of a typical brake valve.

Referring now to Figure 1, the brake system is shown schematically, as viewed looking forwardly in a typical aircraft, with the pilot's position shown on the left, and the co-pilot's position shown at the right. The hydraulic brake fluid is stored within the reservoir 5 from which it is drawn through the line 6 by the pump 7. It is delivered at high pressure, which may be of the order of 1,000 lbs. per sq. in., through the filter 8 and the check valve 9. A branch line 10 runs to the pressure switch 11, which is adapted to interrupt the motor-driven pump 7 in the event any excessive pressure is developed within the line 10, or that portion of the system to which it is connected. The main pressure supply line is indicated at 12 from which it branches to the left and to the right into the branch pressure lines 13 and 14. As the fluid pressure enters each of these branch lines, it passes through the check valves 15 and 16, respectively, which prevent fluid from flowing back into the main pressure line 12, and back to the discharge side of the pump. In the branch pressure line 13, there is provided a pressure relief valve 17, which is connected by means of the relief line 18, to the main return line 19 and thence through the return line portion 20 and back into the reservoir 5. Connected to the branch pressure line 13 is an accumulator 21 and a pressure indicating gauge 23, and a similar accumulator 22 and pressure gauge 24 is connected to the branch pressure line 14.

As the left branch pressure line continues, it branches at the cross connection 25 into the further pressure lines 27, 29 and 31 which communicate with the set of operating valves on the left or pilot's side of the airplane. As the right branch pressure line continues, it also separates at the cross-fitting 26 into the further pressure lines 28, 30 and 32 which communicate with the set of operating valves on the right or co-pilot's side of the airplane. From the cross-fitting in the pressure line 13 at the left side of the airplane a pressure branch 33 extends across to the right side of the airplane, and similarly a pressure line 34 from the fitting 26 in the pressure line 14 on the right side of the airplane extends across to the left side of the airplane.

The pilot's position on the left side is provided with a pair of pedal actuated brake valve assemblies 35 and 37 which receive their fluid pressure through the above mentioned lines 27 and 31, respectively, and the co-pilot's position on the right side of the airplane is provided with similar brake valve assemblies 36 and 38 which receive their fluid pressure through the lines 32 and 23, respectively. The brake valves 35, 36, 37 and 38 are each identical and will be more fully explained in connection with the detailed showing of the valve 35 in Figure 3. Each of these valves is provided with connections to the wheel brakes through the lines 39, 40, 41 and 42, respectively, through the interconnector and equalizer valves 43 and 44 which are more fully shown in detail in Figure 2. The brake valves 35, 36, 37 and 38 are provided with connections to the main return line 19 by way of the branch lines 45, 46, 47 and 48, respectively, the latter three lines being connected into the return header 49 to join the main return line 19 at its junction with the branch return 45 from the valve 35.

The airplane to which the present brake system is shown and described as being applied is preferably provided with a pair of laterally disposed landing wheels each of which is provided with inboard and outboard wheel brake units. The left interconnector and equalizer valve 43 is provided with an outlet 85 in communication with the fluid line 51 to the outboard wheel brake unit 55 of the left landing gear wheel 59. Similarly there is provided an adjacent outlet 86, in the interconnector and equalizer valve 43, for communication through the line 53 with the inboard wheel brake unit 57 of the same left wheel 59. The right interconnector and equalizer valve 44 is similarly provided with adjacent outlets and communication through the lines 52 and 54 with the outboard and inboard wheel brake units 56 and 58, respectively, of the landing gear wheel 60 on the right side of the airplane.

Referring now to Figure 3, the numeral 35 indicates the pedal-actuated brake valve 35 shown in the diagram in Figure 1, which valve is also identical with the brake valves 36, 37 and 38. This brake valve, which is shown schematically in this figure may preferably be of the type shown and described in Patent No. 2,397,234 to J. R. Blake which issued March 26, 1946. The valve comprises essentially a substantially cylindrical body or housing portion 61 having a straight bore 62 of uniform diameter throughout, and closed at the ends of the housing by suitable removable flanged caps, the fastening means for which have not been shown in this schematic cross-section. An internally screw threaded port 63 is provided for coupling the pressure line 27 to the valve, and similar ports 64 and 65 are provided for coupling the fluid line 39 and the return line 45, respectively.

A pressure valve unit 66 is mounted for axial movement within the cylindrical body of the valve, being guided within the valve guide abutment portion 67, which forms a pressure chamber 68 open to the pressure inlet port 63. The pressure valve unit 66 includes a piston stem portion 69 within the guide portion 67, which guide portion is provided with ports 70 serving to provide communication between the pressure chamber 68 and the chamber 71 which is open to the brake actuating line 39 through the threaded port 64. A piston-valve unit 73 is reciprocally mounted within the bore 62, having a long skirt or guide portion 75 at its farther end to form an intermediate chamber 76 open to the return port 65 and the return line 45. The adjacent end of the stem 69 is adapted to form, in cooperation with the adjacent end of the piston portion 73, a return valve unit 72 which is urged into its normal position by the compression spring 74 interposed between the abutment portion 67, and the piston portion 73. Within the skirt portion 75 at the other end of the reciprocable piston-valve, there is interposed a further compression spring 77 between the piston-valve unit and the keeper 78.

The piston-valve assembly 73 is also provided with a central bore or passage 80 which allows fluid communication between the chamber 71 and the chamber within the skirt portion 75, and the transverse branches 81 provide communication between the central bore 80 and the return chamber 76. A plunger or stem 79 is guidingly mounted for axial reciprocation through the end wall of the cylindrical body 61, bearing against the keeper 78. This plunger is arranged to transmit braking forces from the operator's foot, through suitable pedal mechanism, against the keeper 78, the compression spring 77, and the elements comprising the brake valve assembly 35. It will be understood that suitable packing rings or seals are preferably disposed at each of the surfaces between the relatively moving parts of the present valve assembly in order to provide a fluid-tight arrangement, and that these seals have necessarily been omitted from the schematic showing in Figure 3 for purposes of clarity.

Referring now to Figure 2, there is shown an enlarged cross-section of the interconnector and equalizer valve assembly 43 on the left or pilot's side of the airplane, which assembly is identical in construction with the counterpart 44 on the right, or co-pilot's side of the airplane. The valve assembly 43 comprises a cylindrical body portion 82, in which there has been integrally formed the internally threaded ports 83, 84, 85 and 86, adapted to be connected to the lines 39, 40, 51 and 53, respectively. It will be noted from Figure 1, that the line 39 communicates with the brake valve 35 on the left side of the airplane, and that the line 40 communicates with the brake valve 36 on the right side of the airplane. The lines 51 and 53, communicate with the outboard and inboard brake units 55 and 57, respectively, of the left wheel 59. The body or housing portion 82 is provided with a centrally bored cylinder portion 87 within which the primary piston 88 is adapted to reciprocate in the axial direction of the cylinder. The piston 88 is provided with a suitable pressure seal 88a and divides the centrally bored portion into the chambers 89 and 90.

The body 82 of the valve assembly is bored at each end to a slightly larger diameter than that of the central bore 87, which the end bores meet at the shoulders 87a and 87b. Valve guide portions 91 and 92 are disposed within the enlarged diameter end portions of the body 82, being retained therein by the threaded end cap portions 93 and 94, respectively. The central piston 88 is provided with axially extending rod portions having valves 88b and 88c formed at each end. The valve guide portion 91 has a tapered spider portion 91a extending into the chamber 89 adapted to guide the piston valve end 88b and the corresponding valve guide element 92 has a like portion 92a for guiding the valve end 88c. The valve guide element 91 is bored for the reception of a reciprocable valve member 95, and its counterpart, the valve guide element 92 has a similar internally bored portion for receiving the reciprocable valve element 96. The end cap portion 93 is arranged to house a spring loaded ball valve 97 in conjunction with the terminal fitting 97b and the interposed spring 97a. Similarly the end cap 94 houses the spring loaded ball valve 98 in cooperation with the terminal fitting 98b and the interposed spring 98a.

The terminal fittings 97b and 98b are suitably threaded to engage the end caps 93 and 94, having shouldered portions by which they may be tightened against the end caps and are provided with threaded terminals for engagement with the pressure lines 29 and 34, respectively. Radially disposed passages 91b are provided within the guide element 91 to provide communication between the central chamber portion 89 and the port 83 when the valve 88b is in the open position, and the guide element 92 is similarly provided with radial passages 92b to provide similar communication between the chamber 90 and the port 84 when the corresponding valve element 88c is in the open condition. The valve guide elements 91 and 92 have their internally bored portions shouldered to limit the inward position of the reciprocable valves 95 and 96, which are urged thereinto by the compression springs 95a and 96a. The guide element 91 and the end cap 93 are adapted to form between them the end chamber 99 which is in communication with the central chamber 89 by means of the communicating passages 91c extending longitudinally through the guide element 91. Similarly the guide element 92 and the end cap 94 form between them the end chamber 100 which is open to the central chamber 90 at all times by virtue of the longitudinal communicating passages 92c extending through the guide element 92.

It will, accordingly, be noted from an examination of Figure 2, that the primary piston 88 and its valve portions 88b and 88c guided by the portions 91a and 92a, respectively, are free to move, either to the left, or to the right as the case may be. The sliding valves 95 and 96, retained by the guide elements 91 and 92, respectively, are urged by the springs 95a and 96a, into their positions of closest approach, in which they bear against the shouldered portions of the bores of the guide elements 91 and 92 but in which they each fall short of closing the valves formed by the piston portions 88b and 88c. Opposite or outward movement of the valves 95 and 96, however, within the limits of their motion and by compression of their respective springs 95a and 96a, can unseat the ball valves 97 and 98. They are limited in such outward movement by contact with the stop portions 93a and 94a on the respective end cap fittings. The central chambers 89 and 90 extend through the valve guide elements 91 and 92, respectively, into the chambers 99 and 100, as described above, by virtue of the passages 91c and 92c. As also indicated above, the port 83 is placed in communication with the central chamber 89 by the radial passageways 91b, as controlled by the valve 88b; and similarly the port 84 is placed in communication with the central chamber 90 by the radial passages 92b as they may be controlled by the valve 88c. Similarly the pressure lines 29 and 34 are axially disposed at the opposite ends of the interconnector and equalizer valve 43 and are closed off from their respective chambers 89—99 and 90—100 by means of the spring loaded ball valves 97 and 98, respectively. As in the case of the brake valve schematically shown and described in connection with Figure 3, each of the relatively moving or movable elements of the present valve are also provided with pressure seals to prevent leakage of fluid at elevated pressures between these elements, or past the respective valve units.

As indicated in Figure 1, two assemblies of the interconnector and equalizer valves, namely assemblies 43 and 44, are required for each dual installation. One valve assembly, namely, 43, is connected to the pilot's left foot brake valve 35 by the line 39, and the same assembly 43 is also connected to the co-pilot's left foot brake valve 36 through the line 40. The line 39 from the pilot's left foot brake valve 35 is capable of communication with the outboard left wheel brake unit 55 through the line 51 as controlled by the left side of the assembly 43; and the line 40 from the co-pilot's left foot brake valve 36 is capable of being placed in communication with the inboard wheel brake unit 57 of the left wheel 59 by means of the line 53 as controlled by the right side of the assembly 43. Similarly the right wheel 60 is subject to brake control from the pilot's and co-pilot's right foot brake valves 37 and 38, through the lines 41 and 42, respectively, which are capable of being placed in communication with the lines 52 and 54, upon proper actuation of the interconnector and equalizer assembly 44 for the control of the outboard and the inboard wheel brake units 56 and 58, respectively, of the right wheel 60.

The description of the operation of the dual brake system shown in Figure 1, embodying the valve assemblies shown in detail in Figures 2 and 3, involve the four principal stages of a complete cycle of operation, namely: (1) Brakes off; (2) brakes being applied; (3) brakes applied and pressure equalized; and (4) brakes being released.

In the first stage of operation, namely, the "brakes off" condition, let us assume that the system shown in Figure 1 has been filled with an adequate supply of brake fluid throughout all portions of the system and to the required level within the reservoir 5. The pump 7 is driven from a suitable power source, drawing fluid through the line 6 into and through the filter 8, past the check valve 9 and into the main pressure line 12, from which it branches through 13 and 14 into the left and right halves of the system, respectively. In branching into the two halves of the system the fluid passes through the respective check valves 15 and 16, past those portions of these pressure lines which are open to the accumulators 21 and 22. The latter serve to accumulate and build up a reserve pressure on the work side of each accumulator, which pressure is indicated by the pressure gauges 23 and 24, respectively. The pressure switch 11 at the end of the branch line 10 provides an unloading feature by disconnection of the power source of the pump 7 upon the creation of excessive pressures. A further relief from pressures in excess of a predetermined magnitude is provided by the pressure relief valve 17 past which the fluid is returned through the relief line 18 and the return line 20 to the reservoir 5, as previously described, to relieve the system of such excess pressures. Accordingly, with the pump running and the full pressure upon the system and without braking forces applied to the pedal plungers 79 of the brake valves 35, 36, 37 and 38, the full pressure will be built up within the pressure chambers 68 of each brake valve as the fluid is transmitted through the pressure branches 27, 28, 31 and 32. In this condition of the system the pressure valve unit 66 of the brake valve 35 (as well as that of the remaining brake valves 36, 37 and 38) will be in the closed position due to the influence of the spring 66a, assisted by the pressure within the line 27 (and the corresponding branches 28, 31 and 32 to the remaining brake valves), and the piston valve 72 will be open due to the influence of the spring 74 moving the piston assembly 73 toward the end of the bore 62 at which it overcomes the lack of brake force on the plunger 79. This places the relief line 18 as well as all of the return portions of the system under atmospheric pressure, and inasmuch as each of the brake valves has its pressure valve unit closed, and its piston valve open, the lines 45—39, 47—41, 46—40 and 48—42 will be open to each other; and accordingly the lines 39, 40, 41 and 42 will also be at atmospheric pressure.

Referring now to Figure 2, inasmuch as the lines 39 and 40 connected to ports 83 and 84, respectively, are under atmospheric pressure, the piston 88 will be in its normal central position at which the valves 88b and 88c will be open and the pressure within the chambers 89 and 99 through the passages 91c, and that within the chambers 90 and 100 through the passages 92c, will also be equal and at atmospheric pressure. The pressure lines 29 and 34 connected to the opposite ends of the assembly 43 are, however, open to the main pressure line 12, and its branches 13 and 14, and the valves 97 and 98 will be closed by their respective springs against the pressure within the system (which might preferably be of the order of one thousand pounds per square inch). The fluid at the terminal connections at the closed ball valves 97 of the assemblies 43 and 44 is accordingly under a pressure of about 1000 p. s. i., and its source is through the power branch 13, and the lines 29 and 33 to the assemblies 43 and 44. The further lines 51 and 62 control the outboard brake units 55 and 56, or the outboard portion of the brake hydraulic system. The fluid at the opposite ball valves 98 is also under a like pressure of about 1000 p. s. i., but its source is through the pressure branch 14 and the branches 34 and 30, which through the respective assemblies 43 and 44 and the further lines 53 and 54 control the inboard brake units 57 and 58, or the inboard portion of the brake hydraulic system. Accordingly, in addition to the relief and return lines, each of the brake valves 35, 36, 37 and 38 is under atmospheric pressure except for their pressure chamber portions up to the pressure valves 66; and the lines 39 and 40 through the central portion of the valve assembly 43, to the brake units 55 and 57, are also under atmospheric pressure. Similarly the lines 41 and 42, and the central chamber portions of the valve assembly 44, through to the brake units 56 and 58, are also under atmospheric pressure and the brake units 55, 56, 57 and 58 accordingly are each in the "brakes-off" condition.

The operation of the system and its parts for the second stage, namely, "brakes being applied," is as follows: Let us assume that the pilot applies the brakes in his portion of the system by exerting braking forces upon the pedal plungers 79 of the brake valves 35 and 37 on his, or the left side of the airplane. This movement of the plunger 79 initially closes the valve 72 thereby closing off the operating line 39 from the return line 45 and the corresponding operating line 41 from its return line 47. Further movement of the plunger 79 and the piston 73 opens the pressure valve 66, subjecting the line 39 to a braking pressure. Chambers 89 and 99 at the left side of each interconnector and equalizer valve assembly 43 and 44 are accordingly subjected to the braking pressures corresponding to that which is passed by the respective brake valves 35 and 37. Since the primary piston 88 is unrestrained, and the chamber 90 is at atmospheric pressure and appreciably below that in the chamber 89, it is obvious that the piston must move to the right, or in the direction of chamber 90, thereby closing the passage between chamber 90 and passage 92b by the closing of the valve 88c. A similar operation obviously will occur in assembly 44. As the braking pressure continues to be applied and is increased in magnitude, the primary piston 88 continues to move toward the right in each of the assemblies 43 and 44, moving the sliding valve unit 96 along with it toward the right, which action in turn causes the small valve 98 to be unseated and opened, thus permitting high pressure fluid to enter the chamber 100 and to be directed out through the port 86 of each assembly 43 and 44, and thereby into the lines 53 and 54 connected to the inboard brake units of each wheel, or the inboard brake system. During this continued movement of the piston 88, the sliding valve unit 96 maintains the closed condition of the valve 88c, thereby preventing fluid pressure flow back into the line 40.

The condition of the entire system and its parts for the third condition, namely, "brakes applied and pressure equalized," is as follows: Continued application of pedal braking forces to the brake valves 35 and 37 consequently maintains the valves 66 in the open position and the valves 72 in the closed position, permitting continuation of fluid pressure flow through the ball valves 98 of each assembly 43 and 44, such that the pressure on both sides of the primary piston 88 gradually becomes equalized at the brake operating pressure. This also means that the pressure in the brake line 53 connected to the port 86 is now equal to the pressure in the brake line 51 connected to the port 85, and these pressures are also equal to those in the brake lines 52 and 54, assuming equal pressures applied to the pedal plungers 79 of units 35 and 37. This equalizing condition between the brake units of a given wheel exists by virtue of the fact that, as the pressure in chambers 90 increases due to fluid entering through the ball valves 98, the primary pistons 88 are forced to move to the left or toward the chambers 89, as the pressure in the chambers 90 becomes slightly greater than that in chambers 89. The ball valves 98 close due to the concurrent movement of the pistons 88 and valve elements 96, thus preventing any further increase in pressure. As the sliding valve elements 96 again reach their normal positions the continued piston movement opens the valves 88c. The slightly greater pressure in chambers 90, which is required to move the primary pistons 88, is relieved through the passageways 92b, past the now open valves 88c into the line 40 (and 42), each of which is under atmospheric pressure. This results from the continued movement of primary pistons 88 in the direction of chambers 89 and the opening of valves 88c creating communication between chambers 90 and the passages 92b. As soon as this excess pressure is relieved, the relief action discontinues and the passages 92b are again closed by the valves 88c by virtue of the position of the pistons 88 which are not as yet in their central positions but are still displaced toward the right, or chambers 90. The brake line pressures at the ports 85 and 86 are thus equalized, thereby equalizing the pressures within the brake lines 51 and 53, and the braking pressures applied at the brake units 55 and 57, as well as at the brake units 56 and 58 of the other wheel. It will be understood that similar actuation of the brakes can be accomplished by the co-pilot by similar application of braking forces upon his brake valves 36 and 38 on the right side of the airplane with the balancing of the brake line pressures accomplished by similar but opposite movement of the primary pistons 88 in each of the interconnector and equalizer assemblies 43 and 44.

The operation of the system and its parts under the fourth, or "brakes being released" condition, is as follows: As the force exerted by the pilot's feet against the plungers 79 of the valves 35 and 37 is released the piston portions 73 of the brake valves 35 and 37 follow the outwardly moving plungers 79 to the left carrying with them the pressure valve assemblies 66 and 72 (the valves 72 closing first and remaining closed temporarily), and the valves 66 subsequently closing off the fluid pressure after sufficient piston movement has taken place. The braking pressure initially applied through the lines 39 and 41 to the ports 83 of the valves 43 and 44 is accordingly cut off from lines 27 and 31, and the fluid from the brake lines 51 and 52 connected to the ports 85 passes into the chambers 89, past the open valves 88b, through the passageways 91b and into the lines 39 and 41. As the plungers 79 recede further from the interior of the brake valves 35 and 37, the piston units 73 continue movement past the point where the valves 72 again open, some time after the closing of the pressure valves 66, and the lines 39 and 41 then become open through the ports 64, past the open valves 72 and the passages 80 and 81, into the return line 45 and 47 through the ports 65. This permits the braking pressure initially applied to the brake lines 51 and 52 to pass through the interconnector and equalizer valve assemblies 43 and 44, and the brake valves 35 and 37, and to be returned to the hydraulic reservoir 5 through the return lines 45, 19 and 20, respectively. Simultaneously with the reduction of pressure in the chambers 89 by fluid returning to the reservoir 5, communication between the passageways 92b and the chambers 90, past the valves 88c, is opened due to the further movement of the primary pistons 88 in the direction of chambers 89, caused by the differential pressure between chambers 89 and 90. The brake line pressure at the ports 86 through the brake lines 53 and 54 then is relieved and hydraulic fluid from the brake units 57 and 58 return to the reservoir 5 by way of the lines 53, and 54, the ports 86, the chambers 90, past the valves 88c, through the passageways 92b and the lines 40, and 42 through the brake valves 36 and 38, the return branches 46 and 48, the return header 49 and the main return line 19—20. With the release of the brakes and the return of the pistons 88 and all of the remaining elements to their neutral positions, as has just been described, one full cycle of operation has been completed, and the system has again returned to the original static stage as described in the first, or "brakes off," condition.

It will, accordingly, be seen that a dual braking arrangement has been provided in which independent operation of either the inboard or outboard brake system is possible, in the event of the failure of either one of these systems. Inasmuch as each operator station is supplied by a separate pressure line and controls either the inboard or outboard systems having a brake unit on each wheel, either system can be operated independently of the other, should failure occur in the other system. It will also be noted that the full braking capacity of both the inboard and outboard brake systems is available to, and can be applied by either the pilot, or the co-pilot, or both. It will also be observed that these functions and operations are accomplished without the necessity of any mechanical linkage connecting the pilot and co-pilot brake pedals, which thereby eliminates design complications and critical adjustments heretofore required by such linkages. To dispense with these mechanical linkages further eliminates a source of possible difficulty and cause of failure of the entire system. The provision of the novel automatic switching or interconnector and equalizer assembly makes it possible to provide a smoother and more gradual application of the brakes than has heretofore been possible in similar systems. This improved application is due primarily to the differential action of relatively small magnitude resulting from the operation of this equalizer unit. More particularly, and to further clarify this aspect of the invention, the inboard brakes will lead the outboard brakes slightly, or vice versa, depending upon whether the pilot or co-pilot operates the brakes, before equalization of the pressure occurs. This condition results from the fact that one of the systems is operated directly by actuation of the brake valve, while the other system is operated indirectly by the equalizer valve as a secondary reaction to the introduction of pressure in the first system.

It will be understood that the above described modification is but one of many forms which the present invention may take. For example, while the pilot initially controls the outboard brake units of each wheel and the co-pilot controls the inboard brake units, equally effective results may be obtained where the arrangement is reversed, namely, where the pilot controls the inboard, and the co-pilot controls the outboard brake units. It is common practice in large aircraft to provide dual or double wheel landing gear units and the improved brake system is equally applicable to such landing gears regardless of the number of wheels, or the number of brake units per wheel. The system can also be arranged for use on a single wheel controlled from two separate stations, or for the simultaneous actuation of the landing flaps from either station. While two brake units have been shown and described for each wheel, obviously the invention is applicable to a greater number per wheel as well as to a vehicle having any number of wheels arranged for braking. It will also be apparent that either operator can brake the wheels with different braking force and when the other half of the system is brought into action the equalization is made only between the units of a given wheel, and not as between the several wheels. The equalization of pressures by the equalizer valve will be as complete as may be obtained in accurately fitting hydraulic equipment of the present type. Accordingly, with due allowance for friction, seals, inertia, etc., the use of the term "equalization" in any of its forms herein will be understood to mean that the pressures will be substantially equalized.

It will, of course, be obvious that the improved valve means has been shown and described in conjunction with a wheel brake system for explanatory reasons only, and that it is not limited to use therewith but enjoys general application in other fluid systems.

Other forms and modifications of the present invention, which will occur to those skilled in the art after reading the foregoing description, are intended to fall within the scope and spirit of this invention as more particularly set forth in the appended claims.

I claim:

1. Automatic valve means comprising a cylinder, a double-acting piston reciprocable within said cylinder, first and second piston-valves operatively associated with said piston, a normally open fluid inlet connection to said cylinder on each side of said piston, a normally closed pressure connection to said cylinder on each side of said piston, a valve operatively associated with each said pressure connection, said cylinder having an outlet connection on each side of said piston, each said piston-valve disposed such that it controls fluid flow from said inlet connection to said outlet connection on its respective side of said double-acting piston, a valve actuator element on each side of and movable with said piston arranged upon increased fluid pressure within the inlet and outlet connections on one side of said piston and displacement of said piston away from that side to close the piston-valve on the opposite side of said piston and to actuate the valve operatively associated with the pressure connection on that side of the piston to thereby apply fluid pressure to the outlet connection on that side of the piston.

2. An automatic interconnecting and equalizing valve comprising a cylinder, a double-acting free piston reciprocable within said cylinder, first and second piston valves operatively associated with said piston, normally closed pressure connections on each side of said piston, a valve operatively associated with each said pressure connection, said cylinder having outlet ports on each side of said piston, said cylinder having inlet ports on each side of said piston, a movable valve actuator element in said cylinder on each side of and cooperating with said piston arranged to cut-off the flow from the said inlet port to the outlet port on one side of said piston and to open the operatively associated valve in the pressure connection on that side of the piston initiated by displacement of said piston toward that side upon increased pressure within the cylinder on the opposite side of said piston from said inlet port on that side to its respective outlet port.

3. An automatic valve comprising a body having a cylindrical bore forming a cylinder, a double-acting free piston reciprocable within the bore of said cylinder and dividing the same into fluid chambers, said valve body having a fluid inlet port and a fluid outlet port on each side of said piston, normally closed valved connections to the said cylinder on each side of said piston, and movable piston-valve elements reciprocably disposed within said cylinder on each side of said piston arranged to cooperate therewith to cut-off the flow from either one of said fluid inlet ports to its respective fluid outlet port upon displacement of said piston initiated by increase in the fluid pressure in the fluid chamber on the opposite side of said piston, said movable piston-valve elements arranged upon further displacement of said piston to open the valved connection on the side of the cylinder toward which the piston is displaced to permit fluid to enter said chamber portion.

4. An automatic valve comprising a bored body forming a cylinder, a double-acting free piston reciprocable within said cylinder and dividing the same into two fluid chambers, each said fluid chamber having a fluid inlet port and a fluid outlet port normally in communication in the neutral balanced condition of the valve corresponding to a central position of said piston, a normally closed valved high pressure connection to each said fluid chamber, and slide valve elements within each said chamber on each side of said piston arranged to cooperate with said piston to cut-off the flow from one of said fluid inlet ports to its respective fluid outlet port upon displacement of said piston initiated by increase in the fluid pressure in the chamber on the opposite side of said piston, said slide valve elements arranged upon further displacement of said piston to open the valved connection on the side of the cylinder toward which the piston is displaced to permit high pressure fluid to enter said chamber portion.

5. An automatic valve comprising a bored body forming a cylinder, a double-acting unrestrained fluid-balanced piston reciprocable within said cylinder and dividing said cylinder into two fluid chambers, said valve body having an inlet port and an outlet port on each side of said piston for separate fluid flows through each said chamber, normally closed valved connections from a pressure source to each said fluid chamber, a movable slide valve element within each said fluid chamber on each side of said piston arranged to be actuated by said piston to cut-off the said fluid flow from either of said fluid inlet ports in one of said chambers upon displacement of said piston initiated by increase in the fluid pressure in the fluid chamber on the opposite side of said piston, said movable slide valve element arranged upon further displacement of said piston to open the valved connection from said pressure source on the side of the cylinder toward which the piston valve is displaced to permit fluid from said pressure source to enter said chamber portion, and resilient means associated with said actuated slide valve arranged to maintain said fluid flow in its cut-off condition until after said opened valved connection from said pressure source is again closed.

6. Automatic valve means comprising a free piston reciprocable within a cylinder, said cylinder having fluid chambers on each side of said piston, each said fluid chamber having a fluid inlet, a fluid outlet and a normally closed pressure inlet, a slide valve on each side of and actuated by displacement of said piston, means including ports cooperating with each said slide valve effecting fluid interconnection between a first of said fluid inlets and its respective fluid outlet through a first of said chambers, means including valve elements carried on opposite sides of said piston for blocking said fluid interconnection in the other said chamber by the closing of its respective slide valve, and means carried by said closed slide valve for applying equalized hydraulic pressure from the other pressure inlet to the other said fluid outlet initiated by flow through the first said fluid inlet and displacement of said free piston.

7. An automatic interconnecting and equalizing valve for use in a dual hydraulic system comprising a cylinder, a double-acting free piston reciprocable within said cylinder, first and second piston valves operatively associated with said piston, normally closed pressure connections on each side of said piston, a self-closing valve operatively associated with each said pressure connection, said cylinder having outlet ports on each side of said piston, said cylinder having inlet ports on each side of said piston, a movable valve actuator element in said cylinder on each side of said piston arranged to actuate the piston valve to cut-off the flow from the said inlet port on a first side of said piston and to open the operatively associated valve in the pressure connection on that first side of the piston initiated by displacement of said piston toward that first side upon increased pressure within the cylinder on the opposite or second side of said piston from said inlet port on that second side, for automatic interconnection and actuation by separate pressure flows at substantially equalized pressures.

8. Automatic valve means comprising a fluid cylinder, a double-acting floating piston reciprocable within said cylinder, said piston dividing said cylinder into fluid chambers, a piston-valve disposed in each said chamber operatively associated with said cylinder and said piston, a normally open fluid inlet connection to each said chamber, a normally closed pressure connection to each said chamber, a self-closing valve operatively associated with each said pressure connection, each said chamber having an outlet connection to its respective pressure-actuated unit, a valve actuator means carried by said piston arranged upon increased fluid pressure within the inlet and outlet connections in one of said chambers and displacement of said piston away from that chamber to close the piston valve in the opposite chamber and to open the said self-closing valve operatively associated with the pressure connection on that side of the piston to thereby apply fluid pressure to the outlet connection on that side of the piston and its respective pressure-actuated unit in such manner that said floating piston automatically equalizes the actuating pressures to both said units.

9. Automatic valve means comprising a cylinder, a free piston reciprocable within a central portion of said cylinder, a slide valve reciprocable within said cylinder on each side of and actuated by displacement of said piston, an inlet into said cylinder on each side of said piston, an outlet from said cylinder on each side of said piston, a pressure connection on each side of said piston at each end of said cylinder, and means including actuating portions carried by said piston cooperating with said slide valve for normally effecting fluid interconnection at low pressure across an end of said cylinder between a first of said inlets and its respective outlet, said means arranged upon increased pressure through said first inlet for applying equalized hydraulic pressure from the second said pressure connection at the opposite end of said cylinder to the second said outlet in the opposite end portion of said cylinder initiated by admission of increased pressure flow through the first said inlet and displacement of said free piston toward said opposite cylinder portion.

THEODORE HOFFACKER, Jr.

References Cited in the file of this patent

UNITED STATES PATENTS

| Number | Name | Date |
|---|---|---|
| 2,208,820 | Tarris | July 23, 1940 |
| 2,273,535 | Peo | Feb. 17, 1942 |
| 2,443,642 | Rockwell | June 22, 1948 |
| 2,467,560 | Majneri | Apr. 19, 1949 |
| 2,491,812 | Hoffacker | Dec. 20, 1949 |
| 2,526,570 | Majneri | Oct. 17, 1950 |